(12) United States Patent
Dierksmeier

(10) Patent No.: US 9,845,700 B2
(45) Date of Patent: Dec. 19, 2017

(54) ACTIVE SEAL SYSTEM

(71) Applicant: Rolls-Royce North American Technologies, Inc., Indianapolis, IN (US)

(72) Inventor: Douglas D. Dierksmeier, Franklin, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 813 days.

(21) Appl. No.: 14/096,726

(22) Filed: Dec. 4, 2013

(65) Prior Publication Data

US 2015/0044018 A1 Feb. 12, 2015

Related U.S. Application Data

(60) Provisional application No. 61/777,993, filed on Mar. 12, 2013.

(51) Int. Cl.
| | | |
|---|---|---|
| *F01D 11/20* | (2006.01) | |
| *F01D 11/00* | (2006.01) | |
| *F01D 15/10* | (2006.01) | |
| *F01D 11/22* | (2006.01) | |

(52) U.S. Cl.
CPC .......... *F01D 11/20* (2013.01); *F01D 11/001* (2013.01); *F01D 15/10* (2013.01); *F01D 11/22* (2013.01); *F05D 2220/76* (2013.01); *F05D 2260/407* (2013.01); *F05D 2300/6033* (2013.01); *F05D 2300/614* (2013.01); *Y02T 50/672* (2013.01)

(58) Field of Classification Search
CPC ...... F01D 11/02; F01D 11/025; F01D 11/614; F01D 2220/76
See application file for complete search history.

(56) References Cited

U.S. PATENT DOCUMENTS

| 5,545,007 | A | 8/1996 | Martin |
| 6,142,477 | A | 11/2000 | Meinzer |
| 7,882,765 | B2 | 2/2011 | Webster et al. |
| 7,976,026 | B2 | 7/2011 | Verma et al. |
| 8,011,255 | B2 | 9/2011 | Arms et al. |
| 8,894,358 | B2 * | 11/2014 | Bacic ............... F01D 11/20 415/126 |
| 2007/0231144 | A1 | 10/2007 | Schreiber |
| 2007/0237623 | A1 | 10/2007 | Adis |
| 2008/0169616 | A1 * | 7/2008 | Awtar ............... F01D 11/025 277/593 |

(Continued)

OTHER PUBLICATIONS

International Search Report and the Written Opinion for International Application No. PCT/US2013/073052, dated Dec. 4, 2013, (11 pages).

*Primary Examiner* — Woody Lee, Jr.
*Assistant Examiner* — Jesse Prager
(74) *Attorney, Agent, or Firm* — Barnes & Thornburg LLP

(57) ABSTRACT

One embodiment of the present disclosure is a unique active seal system. The active seal system includes a rotor and a stationary seal component disposed adjacent to the rotor. The rotor has a rotating seal component and a first electrical generator element. The stationary seal component has a second electrical generator element and a piezoelectric portion in electrical communication with the second electrical generator element.

10 Claims, 2 Drawing Sheets

(56) References Cited

U.S. PATENT DOCUMENTS

| | | | |
|---|---|---|---|
| 2009/0008881 A1* | 1/2009 | Lee | F16J 15/4476 |
| | | | 277/412 |
| 2009/0226306 A1* | 9/2009 | Boeck | F01D 11/22 |
| | | | 415/173.1 |
| 2009/0326834 A1* | 12/2009 | Sundaresan | G01M 5/0066 |
| | | | 702/34 |
| 2010/0003125 A1 | 1/2010 | Smith | |
| 2014/0020390 A1 | 1/2014 | Rhoden et al. | |

\* cited by examiner

ACTIVE SEAL SYSTEM

CROSS REFERENCE TO RELATED APPLICATIONS

This application claims priority to and the benefit of U.S. Provisional Patent Application No. 61/777,993, filed 12 Mar. 2013, the disclosure of which is now expressly incorporated herein by reference.

FIELD OF THE DISCLOSURE

The present disclosure relates to gas turbine engines, and more particularly, to an active seal system for a gas turbine engine.

BACKGROUND

Gas turbine engine seal systems that effectively respond to changes in engine operating points remain an area of interest. Some existing systems have various shortcomings, drawbacks, and disadvantages relative to certain applications. Accordingly, there remains a need for further contributions in this area of technology.

SUMMARY

One embodiment of the present disclosure is a unique active seal system. Another embodiment is another unique active seal system. Another embodiment is a unique method for operating a turbomachine. Other embodiments include apparatuses, systems, devices, hardware, methods, and combinations for active seal systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
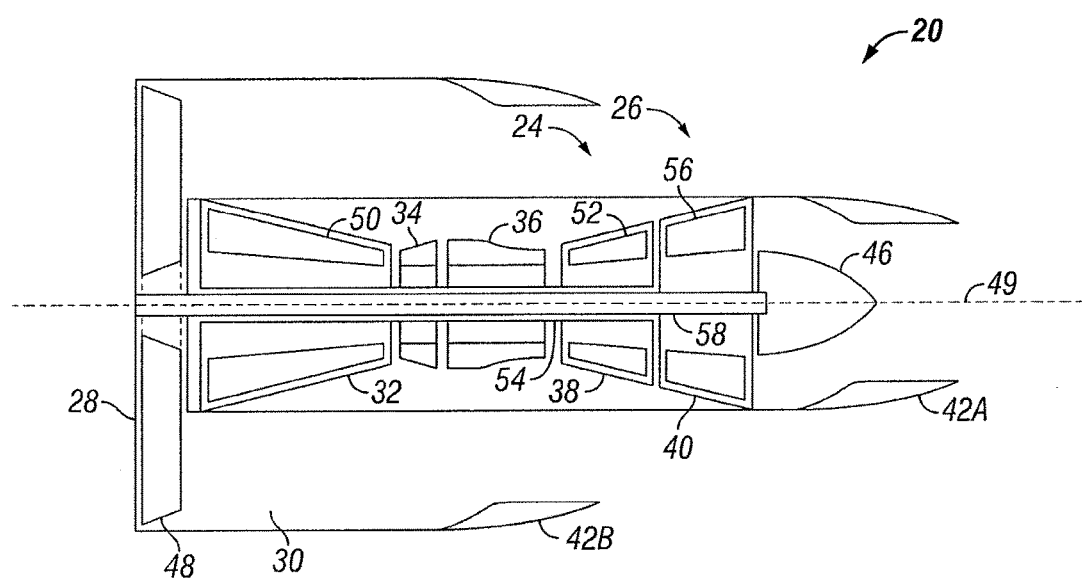
FIG. 1 schematically illustrates some aspects of a non-limiting example of a gas turbine engine in accordance with an embodiment of the present disclosure.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to the drawings, and in particular FIG. 1, there are illustrated some aspects of a non-limiting example of a gas turbine engine 20 in accordance with an embodiment of the present disclosure. In one form, engine 20 is a propulsion engine, e.g., an aircraft propulsion engine. In other embodiments, engine 20 may be any other type of gas turbine engine, e.g., a marine gas turbine engine, an industrial gas turbine engine, or any aero, aero-derivative or non-aero gas turbine engine. In one form, engine 20 is a two spool engine having a high pressure (HP) spool 24 and a low pressure (LP) spool 26. In other embodiments, engine 20 may include only a single spool, or may include three or more spools, e.g., may include an intermediate pressure (IP) spool and/or other spools and/or partial spools, e.g., on-axis or off-axis compressor and/or turbine stages (i.e., stages that rotate about an axis that is the same or different than that of the primary spool(s)). In one form, engine 20 is a turbofan engine. In other embodiments, engine 20 may be any other type of gas turbine engine, such as a turboprop engine, a turboshaft engine, a propfan engine, a turbojet engine or a hybrid or combined cycle engine. As a turbofan engine, LP spool 26 is operative to drive a propulsor 28 in the form of a turbofan (fan) system, which may be referred to as a turbofan, a fan or a fan system. As a turboprop engine, LP spool 26 powers a propulsor 28 in the form of a propeller system (not shown), e.g., via a reduction gearbox (not shown). As a propfan engine, LP spool 26 powers a propulsor 28 in the form of a propfan. In other embodiments, propulsor 28 may take other forms, such as one or more helicopter rotors or tilt-wing aircraft rotors, for example, powered by one or more engines 20 in the form of one or more turboshaft engines.

In one form, engine 20 includes, in addition to fan 28, a bypass duct 30, a compressor 32, a diffuser 34, a combustor 36, a high pressure (HP) turbine 38, a low pressure (LP) turbine 40, a nozzle 42A, a nozzle 42B, and a tailcone 46, which are generally disposed about and/or rotate about an engine centerline 49. In other embodiments, there may be, for example, an intermediate pressure spool having an intermediate pressure turbine or other turbomachinery components, such as those mentioned above. In one form, engine centerline 49 is the axis of rotation of fan 28, compressor 32, turbine 38 and turbine 40. In other embodiments, one or more of fan 28, compressor 32, turbine 38 and turbine 40 may rotate about a different axis of rotation.

In the depicted embodiment, engine 20 core flow is discharged through nozzle 42A, and the bypass flow from fan 28 is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor 32 are in fluid communication with fan 28. Nozzle 42B is in fluid communication with bypass duct 30. Diffuser 34 is in fluid communication with compressor 32. Combustor 36 is fluidly disposed between compressor 32 and turbine 38. Turbine 40 is fluidly disposed between turbine 38 and nozzle 42A. In one form, combustor 36 includes a combustion liner (not shown) that contains a continuous combustion process. In other embodiments, combustor 36 may take other forms, and may be, for example, a wave rotor combustion system, a rotary valve combustion system, a pulse detonation combustion system, a continuous detonation combustion system and/or a slinger combustion system, and may employ deflagration and/or detonation combustion processes.

Fan system 28 includes a fan rotor system 48 driven by LP spool 26. In various embodiments, fan rotor system 48 may include one or more rotors (not shown) that are powered by turbine 40. In various embodiments, fan 28 may include one or more fan vane stages (not shown in FIG. 1) that cooperate with fan blades (not shown) of fan rotor system 48 to compress air and to generate a thrust-producing flow. Bypass duct 30 is operative to transmit a bypass flow generated by fan 28 around the core of engine 20. Compressor 32 includes a compressor rotor system 50. In various embodiments, compressor rotor system 50 includes one or more rotors (not shown) that are powered by turbine 38. Compressor 32 also includes a plurality of compressor vane stages (not shown in FIG. 1) that cooperate with compressor blades (not shown) of compressor rotor system 50 to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages.

Turbine 38 includes a turbine rotor system 52. In various embodiments, turbine rotor system 52 includes one or more rotors having turbine blades (not shown) operative to extract power from the hot gases flowing through turbine 38 (not shown), to drive compressor rotor system 50. Turbine 38 also includes a plurality of turbine vane stages (not shown) that cooperate with the turbine blades of turbine rotor system 52 to extract power from the hot gases discharged by combustor 36. In one form, the turbine vane stages are stationary. In other embodiments, one or more vane stages may be replaced with one or more counter-rotating blade stages. Turbine rotor system 52 is drivingly coupled to compressor rotor system 50 via a shafting system 54. Turbine 40 includes a turbine rotor system 56. In various embodiments, turbine rotor system 56 includes one or more rotors having turbine blades (not shown) operative to drive fan rotor system 48. Turbine 40 also includes a plurality of turbine vane stages (not shown in FIG. 1) that cooperate with the turbine blades of turbine rotor system 56 to extract power from the hot gases discharged by turbine 38. In one form, the turbine vane stages are stationary. In other embodiments, one or more vane stages may be replaced with one or more counter-rotating blade stages. Turbine rotor system 56 is drivingly coupled to fan rotor system 48 via a shafting system 58. In various embodiments, shafting systems 54 and 58 include a plurality of shafts that may rotate at the same or different speeds and directions for driving fan rotor system 48 rotor(s) and compressor rotor system 50 rotor(s). In some embodiments, only a single shaft may be employed in one or both of shafting systems 54 and 58. Turbine 40 is operative to discharge the engine 20 core flow to nozzle 42A.

During normal operation of gas turbine engine 20, air is drawn into the inlet of fan 28 and pressurized. Some of the air pressurized by fan 28 is directed into compressor 32 as core flow, and some of the pressurized air is directed into bypass duct 30 as bypass flow. Compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive compressor 32 and fan 28 via respective shafting systems 54 and 58. The hot gases exiting turbine 40 are discharged through nozzle system 42A, and provide a component of the thrust output by engine 20.

Engine 20 employs a plurality of seal systems for sealing fluids such as air and/or flowpath gases that include combustion products. For example and without limitation, some seal systems may be employed as fore, aft or interstage seals for fan 28, compressor 32, HP turbine 38 and/or LP turbine 40. Seal systems may also be employed as thrust piston or thrust balance seals, which seal the gases used to balance engine rotor thrust. Seal systems may also be employed to control or limit the flow of gases into or out of engine sumps (not shown). Other seal systems may be employed for other purposes not mentioned herein. Seal types may include labyrinth seals having one or more knives that seal against another surface, such as a honeycomb or an abradable material. Other seal types may include brush seals. Yet other types of seals may include carbon or other contact seals, e.g., circumferential carbon seals and/or face seals. Still other seal types not mentioned herein may be employed. Some seal systems may employ a rotating seal component operating in conjunction with a stationary or static seal component to form a seal and control fluid flow therebetween. Other seal systems may employ a rotating seal component and another rotating seal component or a counter-rotating seal component to form a seal therebetween. In any event, it is desirable to control the flow through the seal systems, for example, in order to minimize engine losses, e.g., as with respect to fore, aft or interstage seals, as well as to more accurately control one or more of various engine parameters, e.g., thrust balance or sump purging and/or sump scavenge system operability (e.g., the latter of which may be affected by the amount of fluid entry or exit from a sump purge cavity).

Figure 2:
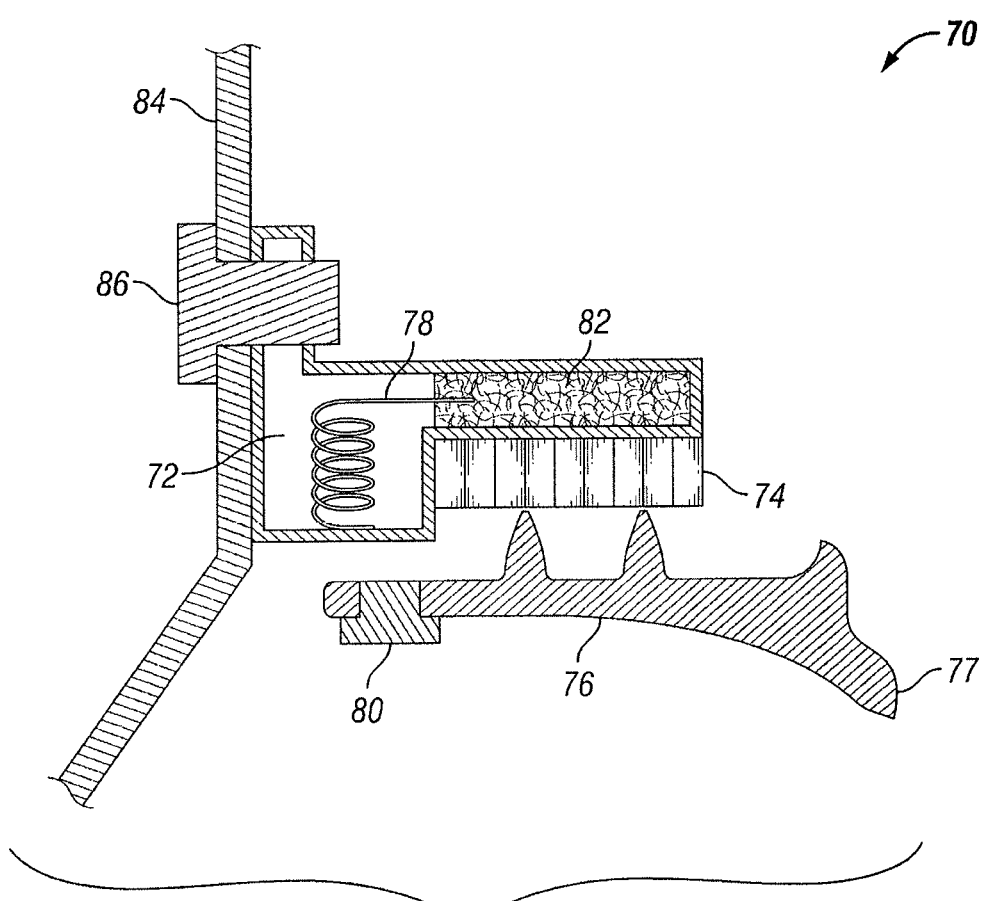
FIG. 2 schematically illustrates some aspects of a non-limiting example of an active seal system in accordance with an embodiment of the present disclosure.

Referring to FIG. 2, some aspects of a non-limiting example of a sealing system 70 in accordance with an embodiment of the present disclosure is schematically depicted. In one form, sealing system 70 is configured for use in engine 20. In other embodiments, seal system 70 may be configured for use in any rotating machine or machine having rotating components. Seal system 70 includes a support 72, an outer seal component 74, an inner seal component 76, a plurality of electrical generator elements 78, a plurality of electrical generator elements 80 and an active fiber composition portion 82, also referred to as a piezoelectric portion 82. In some embodiments, only a single electrical generator element 78 and/or a single electrical generator element 80 may be employed. As with regard to active fiber composition portion 82 or piezoelectric portion 82, the term, "composition," refers to all or part of active fiber composition portion 82 or piezoelectric portion 82 being formed of a composition material, i.e., a material made from at least two constituent materials, wherein at least one of the two constituent materials exhibits piezoelectric properties.

Seal support 72 is configured to support outer seal component 74, piezoelectric portion 78 and electrical generator elements 78. In one form, seal support 72 is affixed to an engine structure 84 such as a case structure, for example, via a cross-key arrangement employing cross keys 86. In other embodiments, seal support 72 may be affixed, coupled or otherwise engaged with any engine 20 structure, rotating or stationary, using any convenient means.

Outer seal component 74 is configured to cooperate with inner seal component 76 to control or restrict the flow of fluid, e.g., air or other gases, through seal system 70, i.e., between outer seal component 74 and inner seal component 76. In one form, outer seal component 74 is a circumferential seal ring, i.e., extending circumferentially at a substantially constant diameter. In other embodiments, outer seal component 74 may take other forms. In one form, outer seal component 74 is a honeycomb seal. In other embodiments, outer seal component 74 may be one or more of other types of seal components, including, for example and without limitation, an abradable material seal, a brush seal component or any other types of seal suitable for use in a gas turbine engine or other turbomachine. In one form, outer seal component 74 is stationary, i.e., is a static seal component. In other embodiments, outer seal component 74 may be rotating in the same direction as inner seal component 76 or may be counter-rotating as with respect to inner seal component 76.

Inner seal component 76 is configured to cooperate with outer seal component 74 to seal, control and/or restrict the flow of fluid, e.g., air or other gases, through seal system 70, i.e., between outer seal component 74 and inner seal component 76. In one form, inner seal component 76 is a circumferential seal ring, i.e., extending circumferentially at a substantially constant diameter. In other embodiments, inner seal component 76 may take other forms, and may represent, for example and without limitation, a turbine blade or blade tip; a compressor blade or blade tip or a fan blade or blade tip, or compressor or turbine knife seals. In one form, inner seal component 76 is a knife seal, otherwise known as a labyrinth seal. In other embodiments, inner seal component 76 may be one or more of other types of seal components, including, for example and without limitation, an abradable material seal, a brush seal component or any other types of seal suitable for use in a gas turbine engine or other turbomachine. In one form, inner seal component 76 is rotating, i.e., is a rotating seal component. In other embodiments, inner seal component 76 may be a stationary seal component, i.e., is a static seal component. As a rotating seal or rotating seal component, inner seal component 76 may be, in various embodiments, configured to rotate in the same direction as outer seal component 74 or may be counter-rotating as with respect to outer seal component 74. Inner seal component 76 forms a part of a rotor 77 that supplies rotation to inner seal component 76. In various embodiments, inner seal component 76 may be formed as a part of rotor 77, may be coupled or affixed to rotor 77, or may be otherwise secured to rotor 77. Outer seal component 74 is disposed adjacent to rotor 77, in particular, to inner seal component 76.

In one form, electrical generator elements 78 and 80 form an electrical generator. In a particular form electrical generator elements 78 and 80 form an inductive generator. Electrical generator elements 78 and 80 are configured to cooperate to generate electrical power in electrical generator element 78 when inner seal component 76 and rotor 77 are rotated. Electrical generator elements 78 and 80 are configured to increase the power supplied to piezoelectric portion 82 with increasing proximity, e.g., increasing proximity (increasing closeness) of electrical generator elements 80 to electrical generator elements 78 as inner seal component 76 increases in size, e.g., due to an increasing rate of rotation of rotor 77.

Electrical generator elements 78 are in electrical communication with piezoelectric portion 82, and are operative to deliver generated electrical power to piezoelectric portion 82, in particular, to piezoelectric fibers disposed within the active fiber composition that forms piezoelectric portion 82. In one form, a plurality of electrical generator elements 78 are employed, e.g., spaced apart circumferentially about support 72 and/or piezoelectric portion 82. In other embodiments, only a single electrical generator element 78 may be employed. In one form, electrical generator elements 78 are disposed within support 72. In other embodiments, electrical generator elements 78 may be disposed on an internal diameter or outside diameter of support 72, within or on piezoelectric portion 82, or any other location suitable for interaction with electrical generator elements 80. In one form, electrical generator elements 78 are electrical windings. In other embodiments, electrical generator elements 78 may be in the form of electrical coils or one or more other devices configured to interact with electrical generator elements 80 for the purpose of generating electrical power in electrical generator elements 78.

Electrical generator elements 80 are retained on rotor 77. In one form, electrical generator elements 80 are riveted in place. In other embodiments, electrical generator elements 80 may be fastened to rotor 77 using any suitable means. In some embodiments, electrical generator elements 80 may be embedded within one or more portions of rotor 77. In one form, a plurality of electrical generator elements 80 are employed, e.g., spaced apart circumferentially about rotor 77. In other embodiments, only a single electrical generator element 80 may be employed. In one form, electrical generator elements 80 are disposed about the periphery of rotor 77. In other embodiments, electrical generator elements 80 may be disposed in any convenient location having relative proximity to electrical generator elements 78 for the generation of electrical power. In one form, electrical generator elements 80 are magnets. In a particular form, electrical generator elements are formed of a ferromagnetic material. In other embodiments, electrical generator elements 80 may be formed of other materials.

Active fiber composition portion 82, or piezoelectric portion 82 is in mechanical communication with, e.g., mechanically coupled to outer seal component 74 in a manner configured for transmitting loads to outer seal component 74 for controlling its size, e.g., diameter. In one form, piezoelectric portion 82 is bonded to outer seal component 74. In other embodiments, other means of securing piezoelectric portion 82 to outer seal component 74 may be employed. In some embodiments, outer seal component 74 may be formed in whole or in part from piezoelectric portion 82. In one form, piezoelectric portion 82 is a continuous piezoelectric ring. In other embodiments, piezoelectric portion 82 may be formed as a segmented ring. In still other embodiments, piezoelectric portion 82 may take other forms. Piezoelectric portion 82 is configured to expand when supplied with electrical power from electrical generator elements 78, thereby expanding outer seal component 74, and changing the size of outer seal component 74 in response to the electrical power received from electrical generator elements 78. In one form, piezoelectric portion 82 includes piezoelectric elements embedded within one or more materials. For example, the piezoelectric materials may be embedded in a ceramic material; a composite material, such as a ceramic matrix composite, an organic matrix composite, a metal matrix composite, a carbon-carbon composite, and/or a reinforced polymer; and/or may be embedded in other senses of the term and within other materials in addition to or in place of the aforementioned materials, for example, embedding by lamination between layers of a metallic material, such as a steel, nickel, magnesium, aluminum, titanium, tungsten and/or various common metals, superalloys and/or other metals. In some embodiments, piezoelectric portion 82 may be made solely from one or more piezoelectric materials. A piezoelectric material is a material that exhibits piezoelectric properties, e.g., changes in physical dimensions based on changes in applied voltage or electrical power. In one form, the piezoelectric elements are piezoelectric materials in the form of piezoelectric fibers. In other embodiments, the piezoelectric elements may take other forms. In a particular form, the piezoelectric fibers are ceramic piezoelectric fibers. Examples of materials for forming ceramic piezoelectric fibers that are suitable for use in various locations of a gas turbine engine or other rotating machines include, but are not limited to, lead zirconate titanate (PZT) (e.g., available from PI Ceramic GmbH, headquartered in Lederhose, Germany); Bismuth Titanate (e.g., available from Piezo Technologies of Indianapolis, Ind., USA); and $BiFeO_3$—$PbZrO_3$—$PbTiO_3$, a ternary solid solution. The gas turbine engine locations in which the ceramic piezoelectric fibers may be employed depends upon the temperature capabilities of the ceramic piezoelectric fiber material, which varies with the material's composition. For example, bismuth titanate exhibits a maximum temperature operating capability of approximately 770° F., whereas lead zirconate titanate exhibits a maximum temperature operating capability of approximately 300° F. Thus, bismuth titanate would be suitable for use in higher temperature locations of a gas turbine engine than those locations which would be appropriate for lead zirconate titanate usage. In other embodiments, other materials may be used to form the ceramic piezoelectric fibers.

In one form, the size change of piezoelectric portion 82 and outer seal component 74 varies with the amount of electrical power received by piezoelectric portion 82 from electrical generator elements 78. The amount of electrical power generated by electrical generator elements 78 and 80, and supplied to piezoelectric portion 82 via electrical generator elements 78, varies with the proximity of electrical generator elements 80 with respect to electrical generator elements 78, and hence, increases with increasing proximity of electrical generator elements 80 to electrical generator elements 78. Power output also varies with rotational speed, e.g., of inner seal component 76/rotor 77. Radial growth of rotor 77 and inner seal component 76, e.g., due to an increased rate of rotation of rotor 77 and inner seal component 76 and the concomitant centrifugal forces acting thereon, and/or temperature changes in rotor 77 and inner seal component 76, and/or pressure loading of rotor 77 and inner seal component 76, increases the proximity of electrical generator elements 80 to electrical generator elements 78, which increases the electrical charge delivered by electrical generator elements 78 to piezoelectric portion 82, thereby increasing the size, e.g., diameter, of piezoelectric portion 82, and hence the size/diameter of outer seal component 74, thereby controlling the gap between outer seal component 74 and inner seal component 76 and achieving a desired gap between outer seal component 74 and inner seal component 76. Similarly, a reduction in the rate of rotation of rotor 77 and inner seal component 76 reduces the proximity of electrical generator elements 80 with respect to electrical generator elements 78, thereby reducing the amount of electrical power generated and delivered to piezoelectric portion 82, thereby reducing the size, e.g., diameter of piezoelectric portion 82 and hence that of outer seal component 74, achieving a desired gap between outer seal component 74 and inner seal component 76. Accordingly, in one aspect of embodiments of the present disclosure, a seal gap or flow area may be controlled essentially automatically by the rate of rotation of the rotor, e.g., rotor 77/inner seal component 76. In some embodiments, electronic components, may be employed to smooth or otherwise condition the about of power supplied to piezoelectric portion 82. In other embodiments, electronic components may be employed in order to control the power delivered to piezoelectric portion 82 in order to optimize the gap between outer seal component 74 and inner seal component 76 at one or more operating conditions, including transient and/or steady state conditions.

During the operation of engine 20, increases in the size, e.g., diameter, of inner seal component 76, e.g., due to increases in rotational speed of rotor 77, temperature increases and/or pressure increases in rotor 77 and/or inner seal component 76, increase the proximity of electrical generator elements 80 as with respect to electrical generator elements 78, resulting in increased power output from electrical generator elements 80 into piezoelectric portion 82. The increased power increases the size, e.g., diameter, of piezoelectric portion 82, and hence, outer seal component 74, maintaining a desired gap between inner seal component 76 and outer seal component 74. Conversely, decreases in the size, e.g., diameter, of inner seal component 76, e.g., due to decreases in rotational speed of rotor 77, temperature increases and/or pressure increases in rotor 77 and/or inner seal component 76, decreases the proximity of electrical generator elements 80 as with respect to electrical generator elements 78, resulting in decreased power output from electrical generator elements 80 into piezoelectric portion 82. The decreased power decreases the size, e.g., diameter, of piezoelectric portion 82, and hence, outer seal component 74, maintaining a desired gap between inner seal component 76 and outer seal component 74.

Embodiments of the present disclosure include an active seal system, comprising: a rotor having a rotating seal component and a first electrical generator element; and a stationary seal component disposed adjacent to the rotor and having a second electrical generator element and a piezoelectric portion in electrical communication with the second electrical generator element, wherein the first electrical generator element and the second electrical generator element are configured to cooperate to generate electrical power in the second electrical generator element when the rotor is rotated; and wherein the piezoelectric portion is configured to change a size of at least a part of the stationary seal component in response electrical power received from the second electrical generator element.

In a refinement, the first electrical generating element and the second electrical generating element form an electrical generator.

In another refinement, the electrical generator is an inductive generator.

In yet another refinement, the size change of the at least a part of the stationary seal component varies with an amount of the electrical power received by the piezoelectric portion.

In still another refinement, the amount of the electrical power received by the piezoelectric portion increases with increasing proximity of the first electrical generator element to the second electrical generator element.

In yet still another refinement, the active seal system is configured whereby radial growth of the rotor increases proximity of the first electrical generator element to the second electrical generator element.

In a further refinement, the at least a part of the stationary seal component is a static seal; wherein the piezoelectric portion is in mechanical communication with the static seal; and wherein the static seal is configured to seal a fluid in conjunction with a rotating seal.

In a yet further refinement, the rotating sealing component is a circumferential seal ring.

In a still further refinement, the stationary seal component is a circumferential seal ring.

In a yet still further refinement, the piezoelectric portion is formed of a composition material including an embedded piezoelectric material.

In another further refinement, the piezoelectric portion is formed at least in part of ceramic piezoelectric fibers.

In yet another further refinement, the piezoelectric portion is a component of a fluid seal operable to interface with another component of the active seal system to restrict or control the flow of a fluid through the active seal system.

In still another further refinement, the first electrical generating element is disposed about the periphery of the rotor.

Embodiments of the present disclosure include an active seal system, comprising: a first electrical generator element; a second electrical generator element; a piezoelectric structure in electrical communication with the second electrical generator element; and a static seal in mechanical communication with the piezoelectric structure, wherein the static seal is disposed about an axis, wherein the first electrical generator element and the second electrical generator element are configured to cooperate to generate electrical power in the second electrical generator element upon a rotation of the first electrical generator element about the axis; and wherein the piezoelectric portion is configured to change a size of the static seal in response electrical power received from the second electrical generator element.

In a refinement, the size change of the static seal varies with an amount of the electrical power received by the piezoelectric structure.

In another refinement, the amount of the electrical power received by the piezoelectric structure increases with increasing proximity of the first electrical generator element to the second electrical generating element.

In yet another refinement, the active seal system further comprises a rotating seal, wherein the static seal is configured to seal a fluid in conjunction with a rotating seal.

Embodiments of the present disclosure include a method for operating a turbomachine, comprising: rotating a first electrical generating element past a second electrical generating element to generate electrical power in the second electrical generating element; supplying the electrical power to a piezoelectric structure to change a size of the piezoelectric structure; and mechanically communicating the size change of the piezoelectric structure to a static seal structure to vary the size of the static seal.

In a refinement, the method further comprises positioning the second electrical generating element adjacent to or within the piezoelectric structure.

In another refinement, the method further comprises positioning the first electrical generating elements adjacent to or within a rotating seal disposed adjacent to the static seal.

While the disclosure has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An active knife seal system, comprising:
a rotor having a rotating seal component and a first electrical generator element; and
a stationary support;
a stationary seal component coupled to the stationary support to move radially relative to the stationary support and disposed adjacent to the rotor;
a second electrical generator element coupled to the stationary support in a fixed position relative to the stationary support;
and a piezoelectric portion in electrical communication with the second electrical generator element;
wherein the first electrical generator element and the second electrical generator element are configured to cooperate to generate electrical power in the second electrical generator element when the rotor is rotated;
wherein the piezoelectric portion is configured to change in radial thickness to cause at least a part of the stationary seal component to move radially in response to changes in an amount of the electrical power received by the piezoelectric portion;
wherein the amount of electrical power received by the piezoelectric portion increases as the first electrical generator element moves radially toward the second electrical generator element; and
wherein the active knife seal system is configured such that radial growth of the rotor causes the first electrical generator element to move toward the second electrical generator element,
wherein the stationary seal component includes an abradable surface arranged to face toward the rotating seal component and engage the rotating seal component to minimize any gap formed between the stationary seal component and the rotating seal component and
wherein the piezoelectric portion is a continuous ring and decreases in radial thickness in response to outward radial movement of the rotating seal component toward the stationary seal component to minimize abrasion of the abradable surface while also minimizing the gap.

2. The active knife seal system of claim 1, wherein the first electrical generator element and the second electrical generator element form an electrical generator.

3. The active knife seal system of claim 2, wherein the electrical generator is an inductive generator.

4. The active knife seal system of claim 1, wherein the at least a part of the stationary seal component is a static seal; wherein the piezoelectric portion is in mechanical communication with the static seal; and wherein the static seal is configured to seal a fluid in conjunction with a rotating seal.

5. The active knife seal system of claim 1, wherein the rotating seal component is a circumferential seal ring.

6. The active knife seal system of claim 1, wherein the stationary seal component is a circumferential seal ring.

7. The active knife seal system of claim 1, wherein the piezoelectric portion is formed of a composition material including an embedded piezoelectric material.

8. The active knife seal system of claim 1, wherein the piezoelectric portion is formed at least in part of ceramic piezoelectric fibers.

9. The active knife seal system of claim 1, wherein the piezoelectric portion is a component of a fluid seal operable to interface with another component of the active seal system to restrict or control a flow of a fluid through the active seal system.

10. The active knife seal system of claim 1, wherein the first electrical generator element is disposed about the periphery of the rotor.

* * * * *